United States Patent [19]

Hutchings et al.

[11] 3,800,594
[45] Apr. 2, 1974

[54] LASER ACCELEROMETER

[75] Inventors: Thomas J. Hutchings, Orange; Wilbur L. Zingery, Long Beach, both of Calif.

[73] Assignee: The United States of America as represented by the Secretary of the Navy, Washington, D.C.

[22] Filed: July 2, 1973

[21] Appl. No.: 375,578

[52] U.S. Cl. ............................. 73/516 R, 73/517 R
[51] Int. Cl. ............................................. G01p 15/08
[58] Field of Search ....... 73/516 LM, 516 R, 517 R, 73/517 B

[56] References Cited
UNITED STATES PATENTS

| 3,506,362 | 4/1970 | Doyle et al. ................. 73/517 R UX |
| 3,517,560 | 6/1970 | Jacobs et al. ................ 73/517 R X |

*Primary Examiner*—James J. Gill
*Attorney, Agent, or Firm*—R. S. Sciascia; P. N. Critchlow

[57] ABSTRACT

A bi-refringent sensor polarizes a laser beam to produce a pair of cross-polarized beams having a frequency difference proportional to the stresses applied to the sensor. The instrument measures accelerations of a movable object and the stresses applied to the sensor are substantially responsive only to accelerations in a particular sensing direction or axis. For this purpose a flexure coupling pivotally supports a stress-producing proof mass and the coupling is pivotally responsive to acceleration forces acting in the sensing direction and pivotally unresponsive to acceleration forces acting in other directions. The sensor stresses produced by the pivotal proof mass vary the index of refraction of the sensor material proportionately the acceleration so that the polarized beams produced by refringence have a frequency difference proportional to acceleration. Detection of this frequency difference provides the acceleration measurement. A magnetic field assembly reduces undesired magnetic coupling between the cross-polarized beams.

7 Claims, 3 Drawing Figures

LASER ACCELEROMETER

BACKGROUND OF THE INVENTION

The present invention relates to laser accelerometers and, in particular, to gas-laser accelerometers utilizing bi-refringent sensors to create a measurable frequency difference representative of the accelerations to be measured.

U.S. Pat. No. 3,517,560 "Accelerometer" issued June 30, 1970 to Earl D. Jacobs and Wilbur L. Zingery discloses many of the basic principles applicable to the use of lasers as a means of detecting and measuring accelerations of a moving object. The disclosure of this patent notes the fact that the frequency of oscillation of a gas laser is one of the purest sources of electromagnetic energy available and that this frequency mainly is dependent upon the spacing between the mirrors which define the length of the gas laser cavity. The mirrors, of course, act as optical resonators for the coherent light beam excited within this cavity. Normally, the laser output has a particular frequency but, as this reference notes, this frequency can be varied if the optical path length seen by the excited coherent light beam of the laser is varied. To produce variations in the optical path length and the output frequency, the disclosure considers a number of differing ways of using stress-sensitive materials as so-called acceleration sensors. In particular, one suggestion is the use of a sensor formed of bi-fringent or doubly-refracting material disposed in the path of the generated gas laser light beam to polarize this light beam into so-called 'extra-ordinary' and 'ordinary' (E and O) rays, these rays 'seeing' different optical path lengths so as to result in a frequency difference which can be photoelectrically detected. If the frequency difference is made responsive to accelerations an instrument is provided that very sensitively measures these accelerations.

Although, the disclosure of this particular reference manifestly contains valuable teachings applicable to the use of gas lasers as accelerometers, it is equally clear that these teachings are primarily of a theoretical nature rather than being concerned with the practical implementation of the basic principles underlying the theory. In other words, to the extent that the reference is presently pertinent, does it not disclose a practical, operative laser accelerometer or a manner in which such an accelerometer can be used to readily measure the accelerations of the moving or flying object.

For example, it can readily be appreciated that such an accelerometer must be exclusively responsive to particular acceleration forces acting in a so-called 'sensing' direction, and that other forces acting in directions other than that which is being sensed be excluded so as to not to affect the output of the instrument. This factor is not considered by the prior art and, in particular, it is not a matter with which the cited reference is in any way concerned at least insofar as the discussion of the double defraction principle in the reference is concerned. A further difficulty inherent in the use of the doubly-refracting sensor is that the cross-polarized beams so produced normally are magnetically coupled. Consequently, when the optical path difference between these beams is small, one of them tends to quench so as to preclude any frequency difference measurement. Although this factor can be controlled to some extent by employing a heavily biased bi-refringence, such bias itself creates a problem since the bias is generated by 'built-in' stresses within the sensor material and these built-in stresses adversely affect the stability of the instrument. For this and other reasons, the use of an unbiased or isotropicbi-refringent material is strongly indicated, but when such materials are used, the magnetic coupling problem inherent in the cross-polarized beams in introduced. Other implementation problems include the facts that laser accelerometers of the type under consideration exhibit a high lock-in frequency and a high dependence on cavity frequency both of which must be significantly reduced to assure reliable operation. Other practical difficulties will become more apparent in the ensuing detailed description.

SUMMARY OF THE PRESENT INVENTION

The present accelerometer assures that its frequency-difference output exclusively represents accelerations in a desired sensing direction by employing a proof mass pivotally coupled to the moving object in such a manner that the mass pivots only in response to accelerations aligned with the desired sensing direction of the instrument. Additionally, in the preferred form of the invention, an isotropic sensor material is employed and special means, such as a particular magnetic field assembly, reduce the coupling between the cross-polarized beams introduced by the bi-refringence sufficiently to assure a reliable output even when the differences in the optical paths seen by these beams becomes very slight. Another preferred feature is the use of a gas laser that employs a dual isotope. These features and others will be fully discussed in the detailed description.

DETAILED DESCRIPTION OF THE DRAWINGS

A preferred form of the invention is illustrated in the accompanying drawings of which:

DETAILED DESCRIPTION OF THE INVENTION

Figure 1:
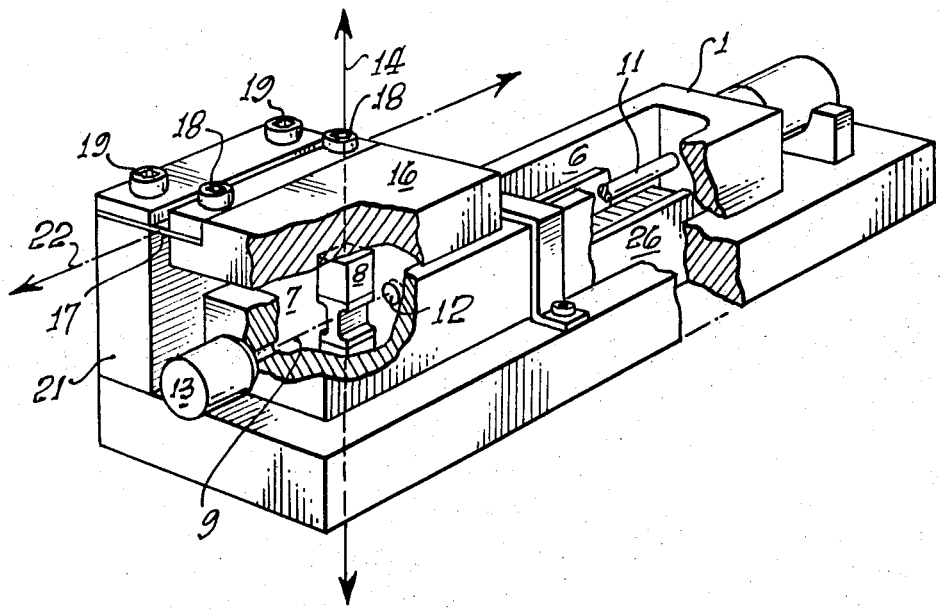
FIG. 1 is a perspective view showing somewhat schematically the general component arrangement used in the present accelerometer, certain portions of the components being broken away to show underlying parts.
Figure 2:
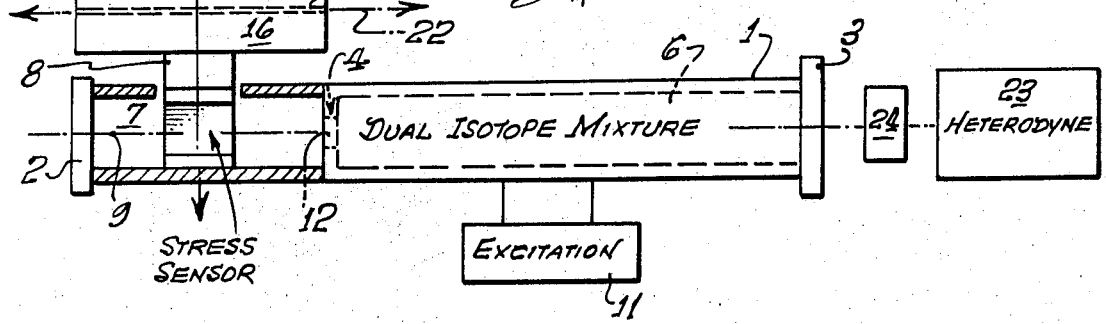
FIG. 2 is a schematic block diagram representative of the component arrangement of FIG. 1.

Referring to FIGS. 1 and 2, the laser of the accelerometer can be seen to include a laser body portion 1 which, according to conventional practice can be formed of an ultra low-expansion fused silica material, the body portion being formed with a central cavity the length of which is defined by mirrors 2 and 3. These mirrors, of course, are the reflecting surfaces which cause an excited gas laser beam to oscillate within the cavity at a particular frequency which normally is determined by the cavity length. In other words, the optical path seen by an excited coherent laser beam is the reflective path between the mirrors and this optical path is a determining factor in the frequency of oscillation. Mirror 2 is a full-reflection mirror while mirror 3 is partially reflective to provide the output.

The laser cavity defined by mirrors 2 and 3 is divided by a partition 4 into two chambers 6 and 7, chamber 6 being an excitation chamber containing a dual isotope gas mixture and chamber 7 being a sensor chamber that mounts a stress sensor 8 a portion of which disposed in the path of the excited laser beam identified by numeral 9 and shown in dot and dash line in this figure. Excitation of the dual isotope mixture can be accomplished in various manners. However, it is preferred to use a DC-excited tube for the present accelerometer and, more particularly, to employ a plasma gain section 11 in the manner apparent in FIG. 1. However, as indicated, other excitation means, such as RF-excitation, can be employed.

Excitation chamber 6 which contains the dual isotope mixture is a closed and tightly sealed chamber preferably maintained at a reduced atmospheric pressure of 3 Torr, while chamber 7 which contains stress tensor 8 is open to environmental conditions. Manifestly, light beam 9 generated by the excitation mixture in chamber 6 must travel freely from one chamber to the other and its travel should not be affected by its passage through partition 4 which divides the two chambers. For this purpose a conventional anti-reflective window 12 is employed to transmit the light beam and avoid as much as possible any losses due to reflections that otherwise might occur.

Another conventional component used to enhance the frequency stability of the laser cavity is a so-called PZT assembly 13 that monitors and maintains the optical length of the laser cavity. As is known, the length of the cavity may change due to thermal expansion and to assure frequency stability it is essential to monitor and compensate for these changes.

Stress sensor 8 is formed of a solid, photoelastic material which is a doubly-refracting or bi-refrigent type of material well known in the optical art. For present purposes, this material should possess good optical properties to the extent that it freely transmits light and, also good mechanical and thermal properties such as provide sufficient elasticity to minimize deformation and also sufficient conductivity to avoid undesirable temperature gradients. Most suitably, the sensor is an elongate, relative-thin member having a bottom and resting upon the base of body portion 1 of the laser although the specific manner in which the sensor is supported is unimportant providing the acceleration forces exerted along the so-called sensing axis of the instrument are applied to the sensor. The sensing axis of the instrument shown in FIG. 1 is along the dashed line 14 and, as seen, the central longitudinal axis of the sensor is aligned with this sensing axis. More specifically, the instrument of FIG. 1 is intended to detect and measure on the accelerations aligned with axis 14.

A proof mass 16 is used to stress the material of sensor 8 proportionately with the degree of acceleration along sensing axis 14 and, as will become apparent, a significant feature of the present invention is the fact that proof mass 16 is mounted in such a manner that the stresses produced by acceleration are exclusively those stresses produced by accelerations acting along the axis 14 as opposed to acceleration forces or other forces acting along other axes of the proof mass. To achieve this desired result, proof mass 16 is flexibly or pivotally coupled to the guided missile or other moving object in which the accelerometer is being used. More specifically, a thin, highly flexible sheet of metal 17 has one of its sides securely clamped by bolts 18 or the like to proof mass 16, while the other of its sides is securely clamped by similar bolts 19 to a block-like standard 21 which, in turn, is rigidly carried by the base portion of the accelerometer instrument. Thus, since the base instrument, as well as standard 21 may be secured to the moving object the entire instrument, including the standard are adapted to move with the object and experience acceleration forces which the object undergoes.

A significant feature of the flexible coupling is that it is so mounted that it freely pivots only about a horizontal axis 22 which, as shown, is normal to sensing axis 14 of the instrument. In the illustrated embodiment, the restricted pivotal movement of the spring 17 is achieved by using the thin sheet metal in the form of a rectangle the corners of which are bolted in the illustrated manner to both the standard and proof mass. Consequently, the spring 17 is effectively rigid so as to be pivotally unresponsive to forces tending to flex it about axes other than axis 22. As already indicated, the manifest purpose of flexible coupling is to assure that stresses created in sensor 8 are proportional to only to forces acting along the sensing axis 14. If desired, the thin sheet spring can be fabricated in such a manner that it is pivotally responsive only along the desired single axis, although it does not appear that such a built in characteristic is operatively essential. Further, other pivotal mountings can be substituted such, for example, as a single-axis jewel pivot but, as is shown, this type of a mount introduces some frictional forces which would tend to degrade the performance. In actual practice, sheet spring 17 can be made of aluminum although materials which are less temperature-sensitive may be found more desirable. Accelerometers of the present type are relatively good temperature sensors so that it is highly desirable to provide materials which are excellent conductors and which consequently avoid as much as possible the establishment of temperature gradients. The proof mass material, in addition to being a good conductor, also should be of a material having a very high density to permit small size and also to reduce cross-axis polarization. For these reasons, it is preferred to use such materials as Mallory or Tungsten although effective operation also can be obtained with a lighter metal such as aluminum.

Functionally considered, proof mass 16 extends transversely over the top end of sensor 8 and is disposed in the light but firm contact with the sensor. For this reason, spring sheet 17 should have a very small spring constant along its sensing axis so that its resilience is sufficient to maintain the contact between the sensor and the proof mass when the instrument is not subjected to acceleration forces. Consequently, except for gravitational forces which will be considered, proof mass 16 normally exerts relatively negligible stressing forces upon sensor 8 and the establishment of the stresses in sensor 8 is dependent primarily upon acceleration forces applied along axis 14 when the moving object increases or decreases its speed of travel. The positive or negative acceleration, of course, pivot the proof mass along its axis 22 to apply these stresses. Most suitably, proof mass 16 has a substantially greater cross-sectional area than the relatively thin sensor and the contact between the two is such as to apply a full surface loading.

Figure 3:
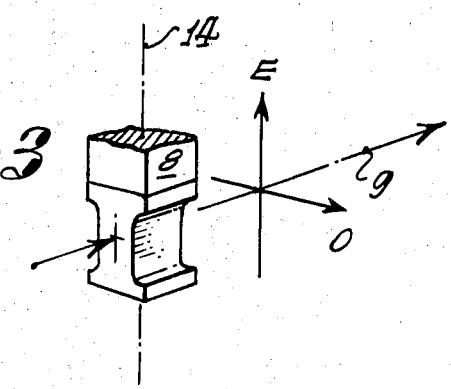
FIG. 3 is a fragmentary portion of the sensor of the FIG. 1 showing the desired cross-polarization introduced by its bi-refringence.

Detection of the acceleration forces utilizes known principles such as the doubly-refracting principle disclosed in the previously-referenced patent of Jacobs and Zingery. Specifically, forces applied to sensor 8 produce stresses within the material of the sensor which, because of the photoelastic nature of the material, bi-refringently cross polarize a coherent beam of light, such as beam 9, passing through the material. In the present arrangement the bi-refringence introduced by the sensor material plane polarizes the transmitted beam into conventional extraordinary E and ordinary O-rays oriented in such a manner that, as shown in FIG. 3, one of the rays is aligned with sensing axis 14 of the instrument while the other ray is disposed perpendicular to this axis. Such mutually orthogonal rays or beams, as is known, see different optical path lengths in their travel back and forth between reflecting mirrors 2 and 3 and, as already has been stated, due to the optical difference between the path lengths, the cross-polarized beams have a frequency difference which can be heterodyned and measured as an output representative of acceleration. Thus, referring to FIG. 2, the output of the instrument is applied to a heterodyned circuit represented by block 23 although, prior to application to this circuit, the output first is processed through an optical analyzer 24. Analyzer 24 is a plane polarizer disposed at 45° to beams E and O so as to pass a component of both of these beams in which the electrical fields are aligned. The obvious reason for the use of such an analyzer is the fact that heterodyning requires an input in which the electric fields are aligned and, of course, the electrical fields of beams E and O, instead of being aligned are disposed at right angles one to the other.

A further feature which significantly improves the operation of the present instrument is that sensor 8 is formed of a bi-refringent material which is isotropic in nature. Thus, in the sense that the term 'isotropic' presently is used, the material of the sensor is of an homogeneous character in which there are no density ingredients or, in other words, no residual stresses. As a result, the material is stressed only when an external force is applied to it and its bi-refringent capacity therefore is dependent upon the application of these external forces. Such stress-free materials can be produced by careful thermal anealing and machining although absolute homogenity must, for practical reasons, be considered as a theoretical rather than a practical goal. However, it is most desirable to avoid the use of a sensor material which has a biased bi-refringence to the extent that it has a certain degree of built-in stress. Any such bias or, in fact, the presence of any residual stresses in the material are undesirable due to the fact that the relaxing under continuous usage of these stresses is an uncontrollable factor which degrades the stability of the instrument. Further, the use of the isotropic sensor provides better accuracy and sensitivity.

The use of the isotropic sensor, however, requires the use of a so-called magnetic field assembly identified in FIG. 1 by numeral 26. The purpose of the magnetic field assembly 26 is to reduce the magnetic coupling cross-polarized beams E and O as shown in FIG. 3. One of the known difficulties inherent in plane-polarized beams such as beams E and O is the fact that these two beams present a magnetic coupling to the extent that when the stresses on the sensor are light the difference between the beams becomes quite small and one of the beams tends to quench. Obviously, the frequency difference used to measure acceleration then would become impossible to achieve. Biased bi-refringence which utilizes a predetermined residual stress can offset this difficulty, but such bias, for reasons already explained, is a degrading factor. Alternatively, the isotropic sensor manifestly must operate under very light stresses so that the magnetic coupling of the plane-polarized beams must be taken into consideration. Magnetic field assembly 26 functionally counteracts the inherent magnetic coupling to such an extent that a frequency difference output can be realized regardless of the degree of stress imposed upon the sensor. Any functionally-equivalent assembly can be employed although the particular assembly used for the present instrument is one which is described in full in a printed document DR-66-L-07, this document being a paper delivered at a 1966 Symposium on Unconventional Inertial Instruments sponsored by the Naval Ordnance Systems Command.

Another feature of the invention is its use of dual isotope gas mixture in excitation chamber 6. It has been found that such mixtures reduce the undesired dependence of the frequency difference of the E and O beams on the cavity frequency. A suitable mixture can be provided by a 9:1 ratio of helium and neon in which there is a mixture of $Ne_{20}$ and $NE_{22}$ at about a 1:1 ratio.

The operation of the present invention should be relatively apparent from the foregoing description. When the instrument is secured to a moving object the acceleration of which is to be measured, accelerations acting in a positive or negative correction along axis 14 cause proof mass 16 to exert more or less force upon sensor 8 and the amount of force exerted determines the stresses established in the sensor. In turn, the stresses introduce a bi-refringence in the laser beam to produce the frequency difference providing the measurable output. As will be noted, the sensing axis of FIG. 1 is a vertical axis so that the instrument is designed to measure accelerations in the vertical direction. However, the instrument can also be oriented in other manners so that the sensor, for example, is disposed in a horizontal plane in which, as already expressed the flexible coupling supplies sufficient force to maintain the desired contact between the sensor and the proof mass. Also, it will be recognized that accelerometers of this type are useful in inertial guidance applications which involve operation outside of the gravity field of the earth. Under such conditions, the flexure again maintains the desired sensor and proof mass contact. If the instrument is to be used within the earth's gravitational field, it is obvious that the weight of the proof sensor will exert a predetermined degree of force on the sensor so that the sensor itself will be subjected to a certain degree of stress. However, this stress can be taken into consideration by using a scaled output and, of course, this weight-produced stress does not involve the same difficulties as the use of a biased bi-refringence which has a built-in stress. As also will be recognized, the sensitivity of an accelerometer of this type is of such a degree that, when used within the earth's gravitational field, the altitude of the moving object can vary the output due to the fact that the gravitational force varies as a square of the distance of the object from the center of the earth. Again, however, such a variation can be accommodated by the use of a scaled output.

In general the present instrument provides a practical laser accelerometer capable of being employed in any moving object to sensitivily and accurately measure the accelerations of the object. It is practical since it is capable of measuring only the acceleration forces aligned with a particular sensing axis which can be varied to accommodate any desired situation or, if desired, multiple instruments can be employed to provide data along different sensing axes.

Obviously many modifications and variations of the present invention are possible in the light of the above teachings. It is therefore to be understood that within the scope of the appended claims the invention may be practiced otherwise than as specifically described.

We claim:

1. A laser accelerometer for measuring accelerations of a moving object along a particular sensing-direction axis comprising:

a body portion carried by said moving object and provided with a laser cavity, laser mirrors disposed one at each end of the cavity for defining the cavity length, a partition dividing the cavity into a sensor chamber and an excitation chamber, means for generating a beam of coherent light in said excitation chamber, window means formed in said partition for passing said beam from one chamber to the other at a particular cavity frequency, an elongate relatively-thin sensor carried by said moving object, said sensor being formed of a solid photoelastic material and being disposed in the sensor chamber in the path of said light beam with its longitudinal axis substantially aligned with said particular sensing-direction axis, a plate-like proof mass extending transversely across and in flush contact with one end portion of said elongate sensor, flexure means carried by said moving object, said means pivotally coupling said proof mass to said object and said coupling having a pivotal axis about which said proof mass freely pivots in response to acceleration forces acting in a direction aligned with said sensing-direction axis of the accelerometer, the other axes of the coupling being relatively rigid for rendering said proof mass pivotally unresponsive to acceleration forces acting along said other axes, whereby stress forces pivotally applied to said sensor by said proof mass are proportional to accelerations aligned with said sensing-direction axis and the index of refraction of the photoelastic sensor material varies proportionally with said aligned accelerations, said stressed sensor material bi-fringently introducing into said laser cavity a pair of spatially-coincident oscillator beams having an orthogonal polarization and having a frequency difference variable in response to said sensed accelerations of the accelerometer, and means for measuring frequency difference.

2. The accelerometer of claim 1 wherein said sensor is formed of an isotropic material having minimal residual stresses in the absence of externally-applied forces, the accelerometer further including means for reducing the magnetic cross-coupling of said oscillator beams sufficiently to preclude the quenching of one of the beams when said sensor stresses are small.

3. The accelerometer of claim 1 wherein said flexure means includes:

a rectilinear thin-sheet spring member and a standard member movably carried by said moving object in a laterally spaced disposition relative to said proof mass, said spring member spanning said space and being rigidly clamped along its outer edges both to said proof mass and said standard, the spring having a small spring constant sufficient to maintain a light and firm contact between the proof mass and the sensor, and said rigid clamps imparting a transverse rigidly to said lateral span of the spring whereby the spring is flexibly-responsive almost exclusively to accelerations acting in a direction aligned with said sensing axis of the accelerometer.

4. The accelerometer of claim 3 wherein said sensor is formed of an isotropic material having minimal residual stresses in the absence of externally applied forces, the accelerometer further including means for reducing the magnetic cross-coupling of said oscillator beams sufficiently to preclude the quenching of one of the beams when said sensor stresses are small.

5. The accelerometer of claim 4 wherein said excitation chamber is filled with a dual isotope gas mixture capable of reducing the dependence of the said measured difference frequency on said cavity frequency.

6. The accelerometer of claim 5 wherein said excitation chamber is filled with a gas mixture formed of a 9:1 ratio of helium and neon, the neon being a dual isotope mixture of $Ne_{20}$ and $Ne_{22}$ of approximately a 1:1 ratio.

7. The acceleration of claim 5 wherein said means for generating said beam in said excitation chamber is provided by a plasma gain section.

* * * * *